July 24, 1951     E. H. MUELLER     2,561,531

VALVE FOR CONTROLLING GASEOUS FUEL

Filed Feb. 18, 1948

INVENTOR.
Ervin H. Mueller

BY

ATTORNEYS

Patented July 24, 1951

2,561,531

UNITED STATES PATENT OFFICE 2,561,531

VALVE FOR CONTROLLING GASEOUS FUEL

Ervin H. Mueller, Grosse Pointe, Mich.

Application February 18, 1948, Serial No. 9,193

1 Claim. (Cl. 158—120)

This invention relates to a valve especially for the purpose of controlling the supply of gaseous fuel to a burner. The trend in the design of gas ranges is to provide smooth unbroken exteriors. The exterior of the ranges is usually afforded by sheet metal paneling and, as a result, many of the working parts and the valves for controlling the flow of gas to the burners are concealed from view. The valves, therefore, are not readily accessible. Of course, the operating stem of the valve is made accessible but the remainder of the valve is, in many instances, completely covered.

When a gas range is installed it is necessary to adjust the outlet orifice of the valve. This is the outlet orifice of the valve from which the gas is more or less injected into the mixer tube of a burner. Heretofore it has been the practice to equip the valves with an adjustable hood, usually on the body of the valve opposite the handle. This hood has the outlet orifice and the orifice cooperated with a fixed needle-type control. By adjusting the hood on screw threads, the outlet orifice could be properly regulated. However, this requires access to the end of the valve adjacent the mixer tube of the burner, and with ranges of present-day design where the valves are practically totally concealed by exterior paneling or trim, much difficulty is experienced in making this adjustment.

The object of the present invention is to provide an improved valve construction wherein the outlet orifice can be adjusted from the handled end of the valve and more specifically through the operating stem. Thus, even though the valve be completely concealed except for its operating stem and handle, which may be called the outer end of the valve, the outlet orifice, which may be considered to be at the inner end of the valve, can be readily adjusted. Thus, the valve of the present invention is admirably adapted for use where the valve is concealed. Reference has been made above to the fact that the valves are concealed in ranges, but this may be the case with other gas burning equipment. Also, the valve of the present invention may be used as well in places where the valve is not necessarily concealed.

A valve structure made in accordance with the invention is shown in the accompanying drawings.

Figure 1:
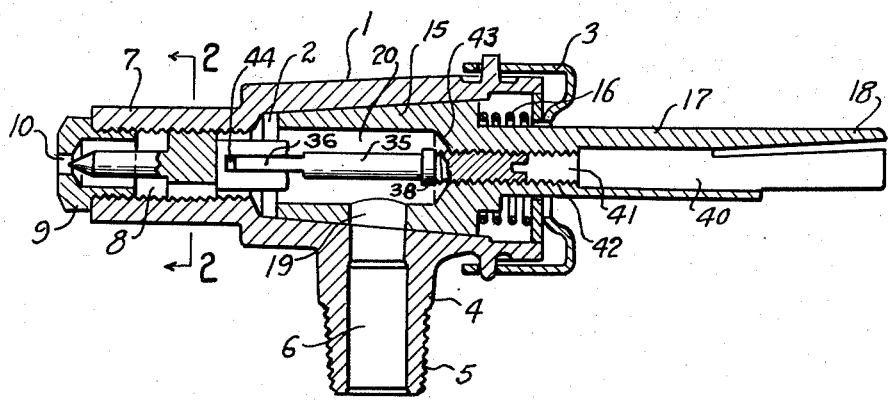
Fig. 1 is a cross sectional view of a valve made in accordance with the invention.

As illustrated in Fig. 1, the valve has a body 1 with a tapered valve chamber 2 therein and this chamber may be closed by a removable cap 3. An extension 4 is screw threaded as at 5 so that it may be mounted in a supply conduit, the extension providing an inlet passage 6. There is an extension 7 forming an outlet passage 8 which communicates with the valve chamber. In the form shown a tip 9 with an outlet orifice 10 is secured to the end of the extension 7, the extension being internally threaded and the tip being externally threaded for this purpose. The tip 9 remains fixed relative to the extension 7 and while it is shown herein as a separate piece, the extension may be integrally formed with an orificed tip.

Insofar as the main valve is concerned, a simple valve structure is shown residing in a tapered plug valve member 15 seating in the chamber and held seated by a spring 16 which reacts against the cap. The valve member has an operating stem 17 which projects through the cap and the stem is fashioned on its end as shown at 18 for the reception of a suitable operating handle (not shown). The valve member has a port 19 and an axial passage 20. When the port is aligned with the inlet 6 the valve is "on" and gas flows through the passage 20 through the outlet passage 8 and through the orifice 10. Needless to say, when the rotary valve member is turned so that the port 19 is disaligned from the inlet passage 6, the valve is "off" and no gas flows therethrough.

Figure 2:
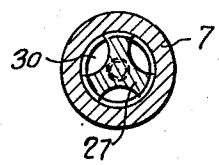
Fig. 2 is a sectional view taken substantially on line 2—2 of Fig. 1 showing an adjustable control member.
Figure 3:
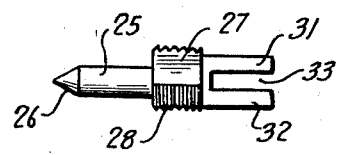
Fig. 3 is an elevational view of the adjustable control member.

The subject matter of this invention resides in structure for regulating the outlet orifice 10 in order to obtain a proper adjustment for a proper flow of gas from the orifice 10 and injection of the gas into the mixer tube of a burner. For controlling the orifice 10 there is a control member with a needle-like extension 25 having a pointed end 26 and having a body portion 27. The body portion has arms or is somewhat of star-shape, as shown in Fig. 2. The ends of the arms are threaded, as at 28, and the body portion is mounted on the internal threads in the extension 7. The structure of the body portion provides passages 30 for the flow of gas. On the opposite side of the body portion 7, the control member is formed for a non-rotatable connection with an operating member. As shown this takes the form of a bifurcated shaped part having arms 31 and 32 spaced apart to provide a space 33.

Figure 4:
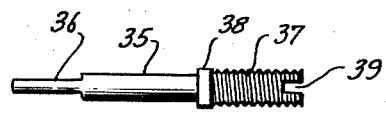
Fig. 4 is an elevational view of an operating member.
Figure 5:
Fig. 5 is an end view of the operating member looking from the left of Fig. 4.

An operating member is shown in Fig. 4 as being of elongated form having an intermediate body portion 35, a flattened end 36, and an opposite end of somewhat larger diameter than the intermediate part 34. This larger end, as illustrated at 37, is threaded for the major portion of its length. A section 38 which lies next adjacent the intermediate part 35 is not threaded. And the threaded end is formed to be engaged by a tool. This is shown as being in the form of a slot 39 for the reception of a screw driver. The control member is mounted in the valve member. For this purpose the stem 17 is hollow as at 40 but the hollow form has a section reduced in size as at 41 and is internally threaded as at 42. The threaded section 41 extends through part of the stem and through a part of the tapered body of the valve member and opens into the passage 20. The threads on the operating member provide an effective gas seal.

In the assembly, as shown in Fig. 1, the part 36 of the operating member projects into the space 33 of the control member. As a result, the operating member and the control member are connected together for rotation in unison. When the assembly is made, the operating member is assembled into the valve member 15 before the valve member is placed in the valve body. This is because the unthreaded part 38 will not pass through the threaded bore 41. After the operating member is thus assembled with the valve member and the control member is assembled in the body, the valve member is inserted in the body with the part 36 entering the space 33 and then the cap 3 may be applied. It is, of course, feasible that the valve be assembled in some other manner. Reference to the above assembly is merely given as an example.

With the valve thus assembled, it will readily be apparent how the orifice may be adjusted and throttled by the needle 25—26. This is accomplished by inserting an instrument, such as a screw driver, through a hollow stem, engaging the same with a slot 39, and turning the operating member. This causes a turning of the control member and it is advanced or retracted on its threads 28 as needed. This, of course, advances or retracts the needle with reference to the orifice 10. If desired, the operating member may be turned until the needle completely closes the orifice 10. If the operating member be operated in the reverse direction, the control member is retracted and the orifice 10 is opened more widely. If this reverse movement is continued, the part 38 ultimately abuts against the wall 43 at the juncture between the passage 20 and the bore 41. Since the part 38 is not threaded, it will not pass into the bore 41.

This is an important factor in the invention as it eliminates any axial forces on the tapered valve member 15 which might otherwise tend to cause or cause the tapered valve member 15 to be unseated in its tapered valve chamber which would result in gas leakage. This situation might occur when some inexperienced person happens to manipulate the operating member. If the operating member is retracted to the point where the shoulder portion 38 abuts the wall 43 the forces are resolved locally in the operating member and the valve member. Also, it will be appreciated that if the needle is forced strongly against the tip 9 there is no resultant axial thrust on the valve member 15. The forces of a thrust of the needle against the wall of the orifice are resolved locally in the needle and in the valve body without placing any thrust on the valve member.

In the initial assembly the operating member and the control member are so relatively positioned that there is no axial thrust between them, there preferably being a space 44 between the end of the operating member and the bottom of the slot 33 and so that when the portion 38 abuts the wall 40 the control member has been retracted to the widest possible opening of the outlet orifice.

I claim:

A valve for controlling gaseous fuel comprising, a body having a valve chamber, a valve member turnable in the chamber, the body and valve member having gas flow ports arranged to be brought into and out of registry and the valve member having an axially disposed gas passage, the valve member having an axially extending operating stem, the body having an axially extending outlet passage which extends in the direction opposite the operating stem and which communicates with the said gas passage in the valve member, said outlet passage having an outlet orifice, a control member having a threaded mounting in the outlet passage and having a needle member for throttling the orifice, the stem being hollow and having internal threads, an operating member having a threaded mounting in the stem, said operating member extending through the said gas passage and having an end engageable through the stem for the turning of the operating member, the operating member and the control member having parts interengaged for relative axial movement and for transmitting rotary motion, whereby turning of the operating member effects turning of the control member to adjust the control member on its threads to variably throttle the orifice, and a shoulder on the operating member positioned within said gas passage and arranged to seat against the valve member at the juncture of the said gas passage and the hollow of the stem to limit the retraction of the operating member in a direction away from the control member.

ERVIN H. MUELLER.

REFERENCES CITED

The following references are of record in the file of this patent:

UNITED STATES PATENTS

| Number | Name | Date |
| --- | --- | --- |
| 576,682 | Levy | Feb. 9, 1897 |
| 2,260,474 | Mueller | Oct. 28, 1941 |

FOREIGN PATENTS

| Number | Country | Date |
| --- | --- | --- |
| 270,742 | Great Britain | Sept. 22, 1927 |
| 102,357 | Australia | Nov. 12, 1936 |